(12) United States Patent
Shibata et al.

(10) Patent No.: US 7,626,381 B2
(45) Date of Patent: Dec. 1, 2009

(54) MAGNETIC SCALE

(75) Inventors: Masayuki Shibata, Tokyo (JP); Hideo Maejima, Kanagawa (JP); Osamu Ochiai, Kanagawa (JP); Yuji Nagai, Kanagawa (JP)

(73) Assignee: Sony Corporation (JP)

( * ) Notice: Subject to any disclaimer, the term of this patent is extended or adjusted under 35 U.S.C. 154(b) by 674 days.

(21) Appl. No.: 11/392,525

(22) Filed: Mar. 29, 2006

(65) Prior Publication Data

US 2006/0220637 A1 Oct. 5, 2006

(30) Foreign Application Priority Data

Mar. 31, 2005 (JP) .............................. 2005-101726

(51) Int. Cl.
*G01B 7/14* (2006.01)
(52) U.S. Cl. .................. 324/207.24; 33/706; 33/708
(58) Field of Classification Search ............ 324/207.13, 324/207.22, 207.24; 33/708, 706, DIG. 1
See application file for complete search history.

(56) References Cited

U.S. PATENT DOCUMENTS 5,588,757 A 12/1996 Unosawa et al.

FOREIGN PATENT DOCUMENTS

| DE | 198 18 799 A1 | 6/1999 |
|---|---|---|
| EP | 1 077 139 A | 2/2001 |
| JP | 62-226007 A | 10/1987 |

OTHER PUBLICATIONS

European Search Report, EP 06 25 1740, Dated Aug. 1, 2006.

*Primary Examiner*—Reena Aurora
(74) *Attorney, Agent, or Firm*—Lerner, David, Littenberg, Krumholz & Mentlik, LLP

(57) ABSTRACT

Disclosed herein is a magnetic scale including a pipe, a strip-shaped magnetic member having a one side surface in the direction across the thickness thereof as a contact surface adapted to be closely attached to the inner surface of the pipe and the other side surface opposite to the one side surface as a back surface, the magnetic member being inserted in the pipe so as to extend straight in the longitudinal direction of the pipe, the magnetic member being formed with magnetic marks provided by a plurality of N poles and S poles alternately arranged in the longitudinal direction of the magnetic member, and a retainer member inserted in the pipe to press the back surface of the magnetic member toward the contact surface of the magnetic member, thereby maintaining a closely contact condition of the contact surface to the inner surface of the pipe. Accordingly, the magnetic member can be reliably protected to thereby improve its durability.

19 Claims, 11 Drawing Sheets

MAGNETIC SCALE

CROSS-REFERENCE TO RELATED APPLICATIONS

The present application claims priority from Japanese Patent Application No. JP 2005-101726 filed on Mar. 31, 2005, the disclosure of which is hereby incorporated by reference herein.

BACKGROUND OF THE INVENTION

The present invention relates to a magnetic scale for use in position detection.

A position detecting device for detecting the position of a print head in a printer is proposed in Japanese Patent Laid-open No. Sho 62-226007, for example.

This position detecting device includes a magnetic scale and a magnetic sensor. The magnetic scale is provided with magnetic marks formed on the outer circumferential surface of a guide shaft for axially guiding the print head and arranged in the longitudinal direction of the guide shaft. The magnetic sensor is integrated with the print head and detects a change in magnetic field of the magnetic marks, thereby outputting a detection signal.

Then, the position of the print head in the longitudinal direction of the guide shaft is obtained according to the detection signal output from the magnetic sensor.

Such a position detecting device having a magnetic scale is widely applied to various machine tools, printers, automatic machines, etc. requiring position detection.

SUMMARY OF THE INVENTION

In the above-mentioned position detecting device, a magnetic member of the magnetic scale is exposed to the outside of the device. Accordingly, in the case that the position detecting device is mounted on a machine tool or the like, there is a possibility that an object may strike the magnetic member to damage it or a cutting fluid may adhere to the magnetic member to degrade it, causing a disadvantage in ensuring the durability of the magnetic scale.

It is desirable to provide a magnetic scale which can reliably protect a magnetic member included therein to improve its durability.

In accordance with the present invention, there is provided a magnetic scale including a pipe; a strip-shaped magnetic member having a one side surface in the direction across the thickness thereof as a contact surface adapted to be closely attached to the inner surface of the pipe and the other side surface opposite to the one side surface as a back surface, the magnetic member being inserted in the pipe so as to extend straight in the longitudinal direction of the pipe, the magnetic member being formed with magnetic marks provided by a plurality of N poles and S poles alternately arranged in the longitudinal direction of the magnetic member; and a retainer member inserted in the pipe to press the back surface of the magnetic member toward the contact surface of the magnetic member, thereby maintaining a closely contact condition of the contact surface to the inner surface of the pipe.

According to the present invention, the magnetic member including the magnetic marks is provided inside of the pipe, and the contact surface of the magnetic member is closely attached to the inner surface of the pipe.

Accordingly, the magnetic member can be protected by the pipe, so that it is possible to prevent a problem such that an object may strike the magnetic member to damage it or a cutting fluid may adhere to the magnetic member to degrade it. Accordingly, the durability of the magnetic scale can be ensured.

Furthermore, the magnetic scale can be assembled simply by using the retainer member.

Other objects and features of the invention will be more fully understood from the following detailed description and appended claims when taken with the accompanying drawings.

DETAILED DESCRIPTION

First Preferred Embodiment

A first preferred embodiment of the present invention will now be described with reference to the drawings.

Figure 1A:
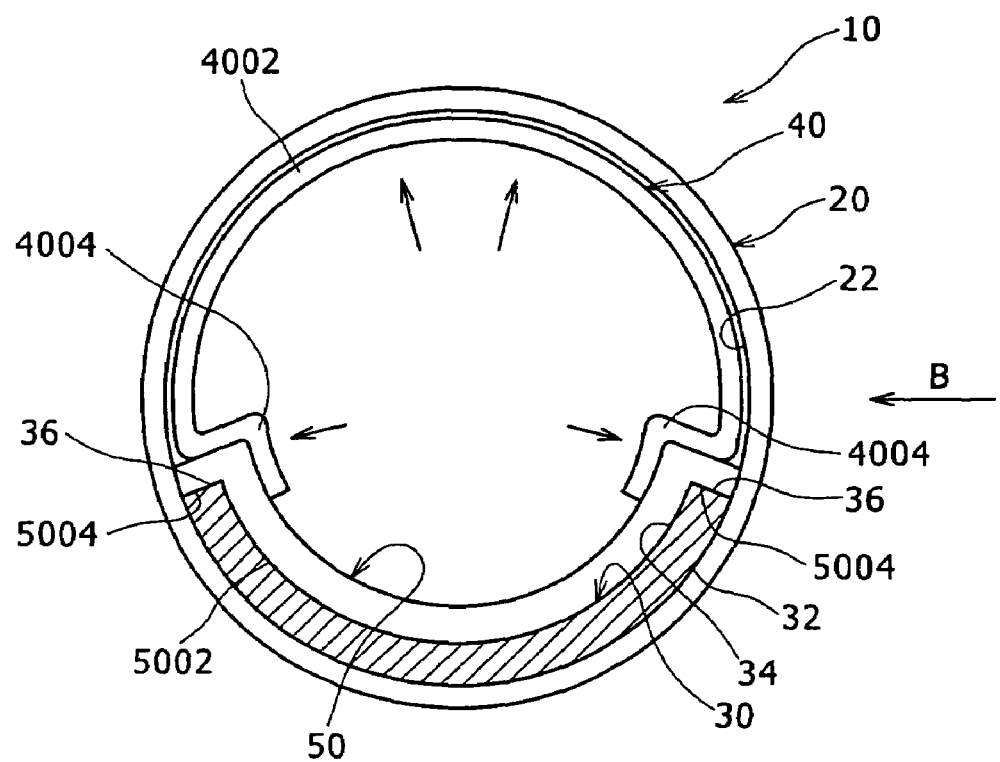
FIG. 1A is a sectional view of a magnetic scale according to a first preferred embodiment of the present invention.
Figure 1B:
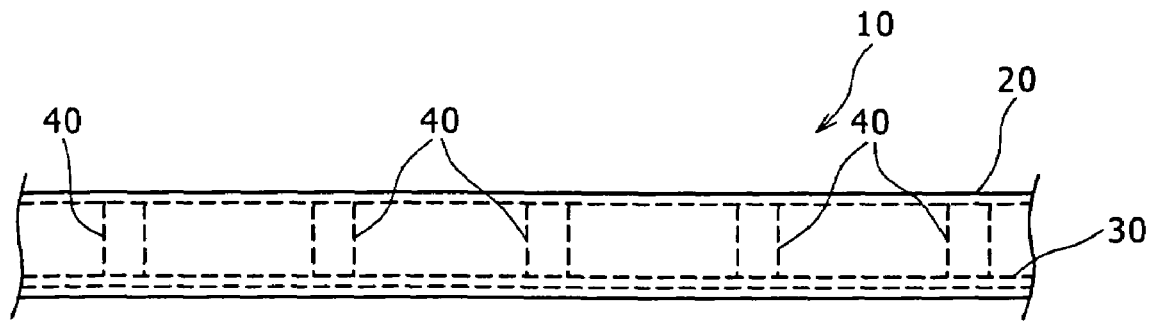
FIG. 1B is a view taken in the direction shown by an arrow B in FIG. 1A.

FIG. 1A is a sectional view of a magnetic scale 10 according to the first preferred embodiment, and FIG. 1B is a view taken in the direction shown by an arrow B in FIG. 1A.

Figure 2A:
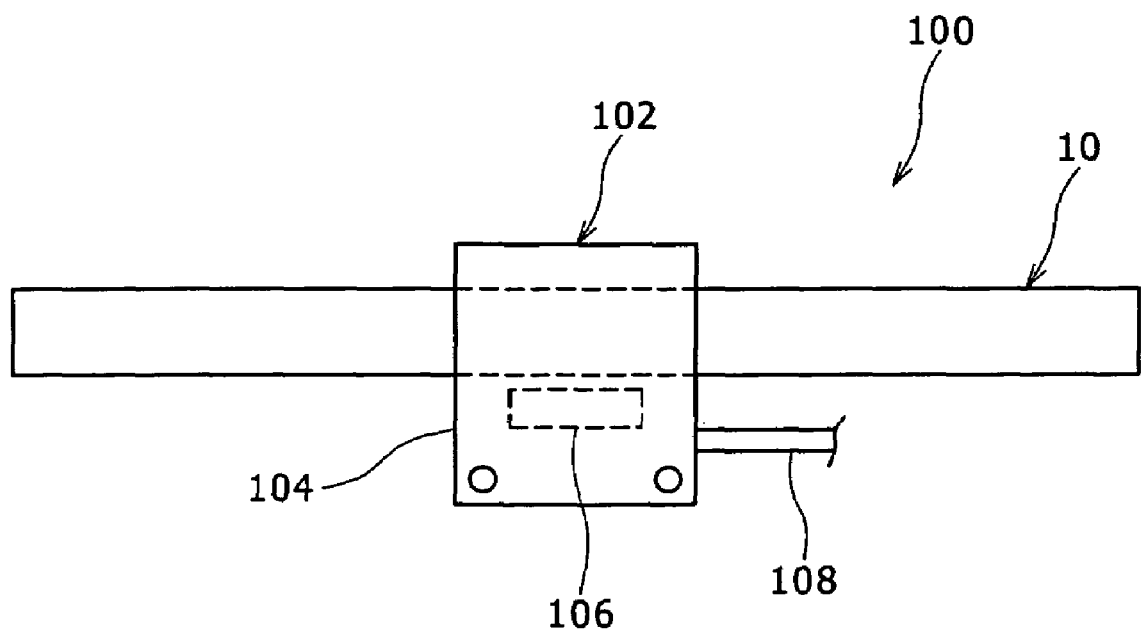
FIG. 2A is a schematic view of a detecting head combined type position detecting device using the magnetic scale according to the first preferred embodiment.

FIG. 2A is a schematic view of a position detecting device 100 using the magnetic scale 10 according to the first preferred embodiment.

As shown in FIG. 2A, the position detecting device 100 includes the magnetic scale 10 and a detecting head 102 supported to the magnetic scale 10 so as to be movable along the magnetic scale 10.

As shown in FIGS. 1A and 1B, the magnetic scale 10 includes a pipe 20, a magnetic member 30, a plurality of retainer members 40, and a support member 50.

The pipe 20 is a circular cylindrical member, and it is formed of a material having no magnetic effect on the magnetic force of the magnetic member 30.

More specifically, the pipe 20 is formed of a nonmagnetic material such as stainless steel SUS 304 (JIS). Further, the material of the pipe 20 may have weak magnetism provided that it has no magnetic effect on the magnetic force of the magnetic member 30. Also in the second preferred embodiment and the following preferred embodiments to be described later, the material of the pipe 20 is similar to that in the first preferred embodiment.

The magnetic member 30 is a strip member having an arcuate cross section, and it has a one side surface (outer surface) in the direction across the thickness of the magnetic member 30 as a contact surface 32 adapted to be closely attached to the inner surface 22 of the pipe 20 and the other side surface (inner surface) in the direction across the thickness of the magnetic member 30 as a back surface 34. Further, the transversely opposite ends of the magnetic member 30 are formed as a pair of end surfaces 36.

The magnetic member 30 is inserted in the pipe 20 so as to extend straight in the longitudinal direction of the pipe 20, and it is formed with magnetic marks provided by a plurality of N poles and S poles alternately arranged in the longitudinal direction of the magnetic member 30.

More specifically, the magnetic member 30 is a polarizable member, and it is formed with magnetic marks provided by a plurality of N poles and S poles alternately arranged with a given pitch in the longitudinal direction of the magnetic member 30. In other words, the magnetic member 30 is formed with magnetic marks including a periodic signal such that N poles and S poles alternately change in the longitudinal direction of the magnetic member 30. In still other words, a periodic magnetic pattern such that N poles and S poles alternately change in the longitudinal direction of the magnetic member 30 is recorded in the magnetic member 30.

The magnetic member 30 is formed of an elastic material such as rubber magnet.

The support member 50 is provided so as to fully cover the back surface 34 of the magnetic member 30.

The support member 50 has an arcuate portion 5002 adapted to abut against the back surface 34 of the magnetic member 30 and a pair of end portions 5004 adapted to abut against the end surfaces 36 of the magnetic member 30.

The support member 50 is formed of a material capable of effectively exerting the magnetic force of the magnetic member 30. More specifically, the support member 50 is formed of a material capable of increasing the magnetic field strength of the magnetic member 30 to thereby increase a surface magnetic flux density on the outer surface of the pipe 20. For example, a magnetic material such as steel may be used as the material of the support member 50. Also in the second preferred embodiment and the following preferred embodiments to be described later, the material of the support member 50 is similar to that in the first preferred embodiment.

The support member 50 may be preliminarily mounted on the magnetic member 30 before inserted into the pipe 20. Alternatively, the support member 50 may be mounted on the magnetic member 30 after inserted into the pipe 20.

In mounting the magnetic member 30 to the pipe 20 or to the support member 50 (or to the retainer member 40 used in the fourth preferred embodiment and the following preferred embodiments), the use of an adhesive or a double-sided adhesive tape is arbitrary.

Each retainer member 40 is inserted in the pipe 20 and functions to press the back surface 34 of the magnetic member 30 toward the contact surface 32, thereby maintaining a closely contact condition of the contact surface 32 to the inner surface 22 of the pipe 20.

As shown in FIG. 1B, the plural retainer members 40 are arranged at given intervals in the longitudinal direction of the magnetic member 30. Each retainer member 40 is provided by a narrow spring plate for exerting an elastic force in the radial direction of the pipe 20.

Each retainer member 40 has an arcuate portion 4002 and a pair of engaging portions 4004. The arcuate portion 4002 is adapted to abut against substantially the half of the inner surface 22 of the pipe 20 as viewed in cross section. The pair of engaging portions 4004 is provided on each side of an arcuate portion 4002 and is adapted to engage the end portions 5004 of the support member 50 and a part of the arcuate portion 5002 of the support member 50 near the end portions 5004.

Each retainer member 40 is installed into the pipe 20 after installing the magnetic member 30 and the support member 50 into the pipe 20. The arcuate portion 4002 of each retainer member 40 elastically abuts at its longitudinally central portion against the inner surface 22 of the pipe 20, and the opposite engaging portions 4004 of each retainer member 40 engage with the end portions 5004 of the support member 50 and a part of the arcuate portion 5002 of the support member 50 near the end portions 5004. Accordingly, the contact surface 32 of the magnetic member 30 is kept in close contact with the inner surface 22 of the pipe 20 over the length of the magnetic member 30 by the elastic forces of the plural retainer members 40.

The polarization of the magnetic member 30, that is, the formation of the magnetic marks is effected by using a dedicated polarizing device.

The polarizing device has a magnetic head and a drive circuit for supplying a drive current to the magnetic head to thereby generate a magnetic field from the magnetic head.

In the condition where the magnetic head of the polarizing device is exposed to the magnetic member 30, the magnetic head is relatively moved in the longitudinal direction of the magnetic member 30, and simultaneously the magnetic field from the magnetic head is applied to the magnetic member 30, thereby forming N poles and S poles alternately arranged with a given pitch in the longitudinal direction of the magnetic member 30, i.e., forming the magnetic marks.

The formation of the magnetic marks in the magnetic member 30 may be performed after attaching the magnetic member 30 to the inner surface 22 of the pipe 20. In this case, the magnetic head of the polarizing device is exposed to the outer surface of the pipe 20, and the magnetic field from the magnetic head is applied through the pipe 20 to the magnetic member 30. Alternatively, the formation of the magnetic marks in the magnetic member 30 may be performed before attaching the magnetic member 30 to the inner surface 22 of the pipe 20. In this case, the magnetic head of the polarizing device is directly exposed to the magnetic member 30 separated from the pipe 20.

In the case that the magnetic marks are formed after attaching the magnetic member 30 to the inner surface 22 of the pipe 20, an installation error of the magnetic member 30 to the inner surface 22 of the pipe 20 or an influence of deformation of the pipe 20 upon the pitch of N poles and S poles to be formed in the magnetic member 30 can be eliminated. Accordingly, as compared with the case that the magnetic field from the polarizing device is directly applied to the magnetic member 30 separated from the pipe 20 to form the magnetic marks, the accuracy of the magnetic marks can be ensured and a detection signal can therefore be obtained accurately by the detecting head 102 (see FIG. 2A).

In the case of using the support member 50 formed of a material capable of effectively exerting the magnetic force of the magnetic member 30 as mentioned above, the magnetic member 30 can be polarized more intensively as compared with the case of not using the support member 50. Accordingly, the magnetic field strength of the magnetic member 30 can be increased to thereby increase a surface magnetic flux density on the outer surface of the pipe 20.

As shown in FIG. 2A, the detecting head 102 includes a slide base 104 and a magnetic sensor 106.

The slide base 104 has a bearing through which the pipe 20 is inserted, so that the slide base 104 is slidably supported through the bearing to the pipe 20 in such a manner as to be slidable in the longitudinal direction of the pipe 20.

The magnetic sensor 106 is built in the slide base 104, and it is so positioned as to be opposed to the magnetic member 30 of the magnetic scale 10 with a given spacing defined therebetween.

The magnetic sensor 106 functions to detect a magnetic field and to output a detection signal according to the intensity of the magnetic field detected. For example, a magnetoresistive element (MR sensor) is used as the magnetic sensor 106. The magnetoresistive element functions so that an electrical resistance changes according to a change in applied magnetic field.

Accordingly, when the detecting head 102 is moved in the longitudinal direction of the pipe 20 to detect the magnetic marks formed in the magnetic member 30, a periodically changing (e.g., sinusoidally changing) detection signal can be obtained from the magnetic sensor 106.

Such a detection signal is supplied from the magnetic sensor 106 through a lead wire 108 to a detecting circuit known in the art, whereby a displacement of the detecting head 102 relative to the magnetic scale 10 is detected by the detecting circuit.

As described above, the magnetic member 30 including the magnetic marks is provided inside of the pipe 20, and the contact surface 32 of the magnetic member 30 is kept in close contact with the inner surface 22 of the pipe 20 by the retainer members 40.

According to the magnetic scale 10 in this preferred embodiment, the magnetic member 30 including the magnetic marks is provided inside of the pipe 20. Accordingly, the magnetic member 30 can be protected by the pipe 20. More specifically, it is possible to prevent a problem such that an object may strike the magnetic member 30 to damage it or a cutting fluid may adhere to the magnetic member 30 to degrade it. Accordingly, the durability of the magnetic scale 10 can be ensured.

Furthermore, the magnetic scale 10 can be assembled simply by using the retainer members 40, and the magnetic flux generated by the magnetic member 30 can be efficiently radiated toward the outer surface of the pipe 20 to thereby increase a surface magnetic flux density on the outer surface of the pipe 20. Accordingly, in the case of applying the magnetic scale 10 to the position detecting device 100, the voltage level of a detection signal output from the magnetic sensor 106 of the detecting head 102 can be ensured.

Furthermore, according to the first preferred embodiment, the back surface 34 of the magnetic member 30 is fully covered with the support member 50 formed of a magnetic material. Accordingly, the magnetic field of the magnetic member 30 can be increased to thereby further increase the surface magnetic flux density on the outer surface of the pipe 20. As a result, in the case of applying the magnetic scale 10 to the position detecting device 100, the voltage level of a detection signal output from the magnetic sensor 106 of the detecting head 102 can be further ensured.

In the case that the magnetic scale 10 is used in the position detecting device 100 as in this preferred embodiment, the pipe 20 can be used as a guide member for slidably supporting the detecting head 102 because the magnetic member 30 is provided inside of the pipe 20. Accordingly, it is unnecessary to provide any guide member for guiding the detecting head 40, thereby allowing a cost reduction and a size reduction.

Figure 2B:
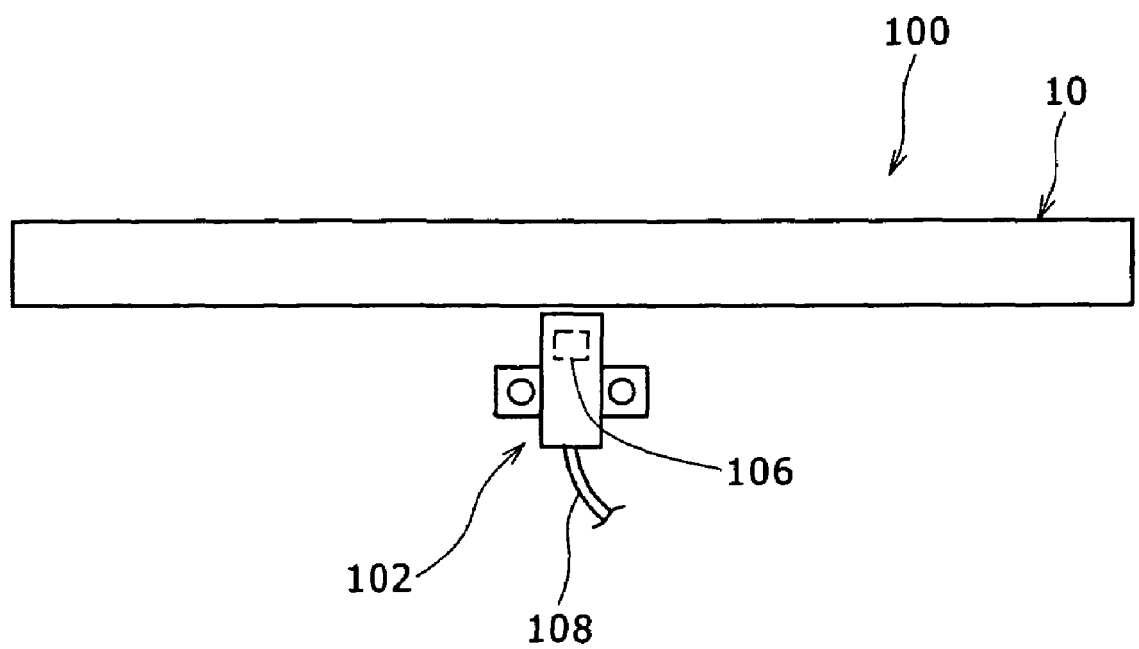
FIG. 2B is a schematic view of a detecting head separate type position detecting device using the magnetic scale according to the first preferred embodiment.

The application of the magnetic scale 10 according to the present invention is not limited to the position detecting device 100 of such a head combined type that the detecting head 102 is combined with the pipe 20 as shown in FIG. 2A. For example, the magnetic scale 10 can be applied also to a separate type position detecting device 100 as shown in FIG. 2B such that the detecting head 102 is not slidably supported to the pipe 20, but separated from the pipe 20.

Second Preferred Embodiment

A second preferred embodiment of the present invention will now be described.

Figure 3A:
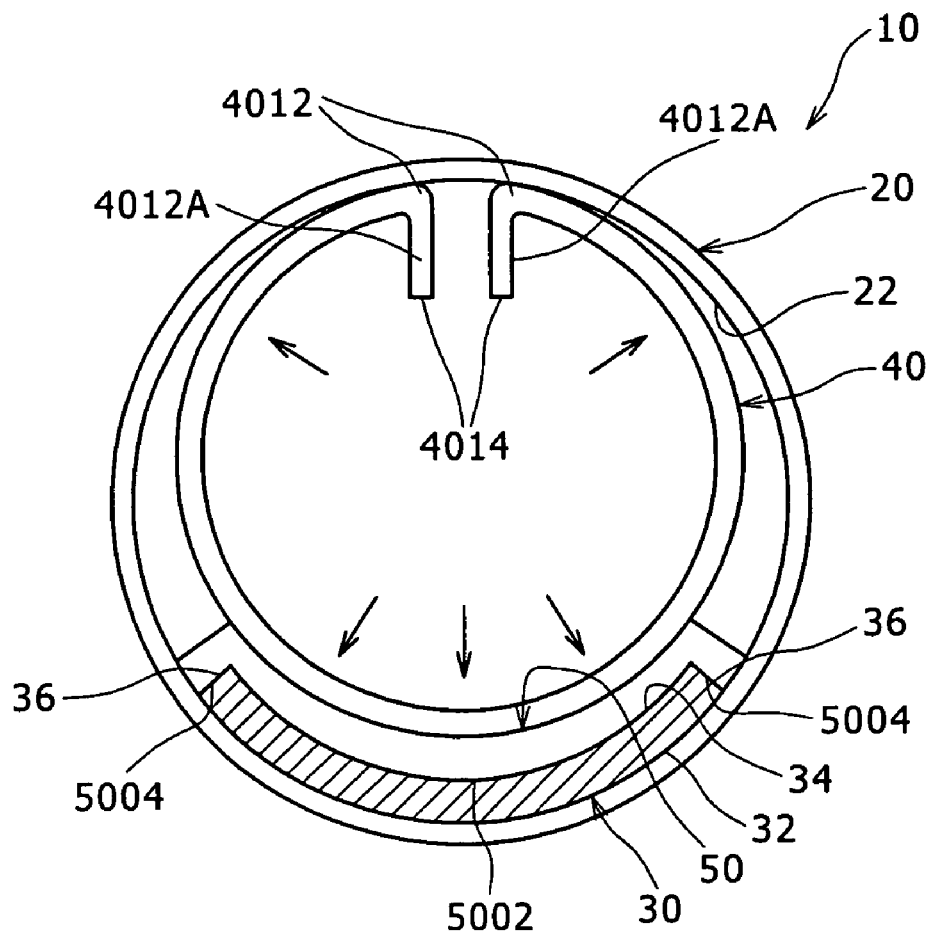
FIG. 3A is a sectional view of a magnetic scale according to a second preferred embodiment of the present invention.
Figure 3B:
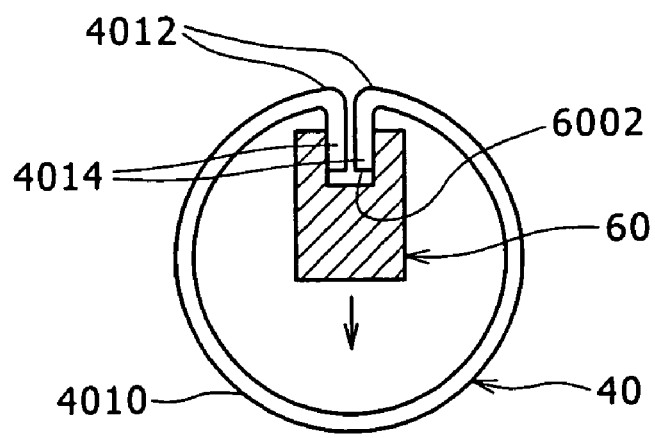
FIG. 3B is a sectional view for illustrating a jig for use in mounting each retainer member inside of the pipe in the second preferred embodiment.

FIG. 3A is a sectional view of a magnetic scale 10 according to the second preferred embodiment, and FIG. 3B is a sectional view for illustrating a jig 60 for use in mounting each retainer member 40 inside of the pipe 20. Like or corresponding parts in the following description are denoted by the same reference numerals as those shown in FIG. 1A.

The second preferred embodiment is different from the first preferred embodiment only in shape of each retainer member 40, and the other configuration is similar to that of the first preferred embodiment.

Each retainer member 40 in the second preferred embodiment has an arcuate portion 4010 adapted to abut against the arcuate portion 5002 of the support member 50 and a pair of arm portions 4012 extending from the opposite ends of the arcuate portion 4010, each arm portion 4012 having an abutting portion 4012A adapted to abut against the inner surface 22 of the pipe 20.

As in the first preferred embodiment, the plural retainer members 40 are arranged at given intervals in the longitudinal direction of the magnetic member 30, and each retainer member 40 is provided by a narrow spring plate for exerting an elastic force in the radial direction of the pipe 20.

Each retainer member 40 is installed into the pipe 20 after installing the magnetic member 30 and the support member 50 into the pipe 20. The abutting portions 4012A of the two arm portions 4012 of each retainer member 40 elastically abut against the inner surface 22 of the pipe 20, so that the arcuate portion 4010 elastically abuts against the arcuate portion 5002 of the support member 50 owing to the reaction from the inner surface 22 of the pipe 20 to the abutting portions 4012A. Accordingly, the contact surface 32 of the magnetic member 30 is kept in close contact with the inner surface 22 of the pipe 20 over the length of the magnetic member 30 by the elastic forces of the plural retainer members 40.

According to the second preferred embodiment, effects similar to those of the first preferred embodiment can be exhibited.

As shown in FIG. 3B, each arm portion 4012 has a lug 4014, and the jig 60 has a groove 6002 for receiving the lugs 4014 of the two arm portions 4012 of each retainer member 40. The lugs 4014 of the two arm portions 4012 are received into the groove 6002 of the jig 60 by inwardly curving the arcuate portion 4010 so that the two arm portions 4012 approach each other. Accordingly, each retainer member 40 is reduced in diameter as shown in FIG. 3B, so that the contour defining the cross section of each retainer member 40 becomes small.

Accordingly, before installing each retainer member 40 into the pipe 20, the jig 60 is preliminarily mounted to each retainer member 40 to reduce the diameter of each retainer member 40. After installing each retainer member 40 into the pipe 20 together with the jig 60, the jig 60 is removed from each retainer member 40 by disengaging the lugs 4014 from the groove 6002. As a result, each retainer member 40 exerts its elastic force to restore its original shape, that is, to increase the diameter, thereby making the arcuate portion 4010 of each retainer member 40 press against the support member 50 and bringing the contact surface 32 of the magnetic member 30 into close contact with the inner surface 22 of the pipe 20. Thus, each retainer member 40 can be installed into the pipe 20 more simply by using the jig 60.

Third Preferred Embodiment

A third preferred embodiment of the present invention will now be described.

Figure 4A:
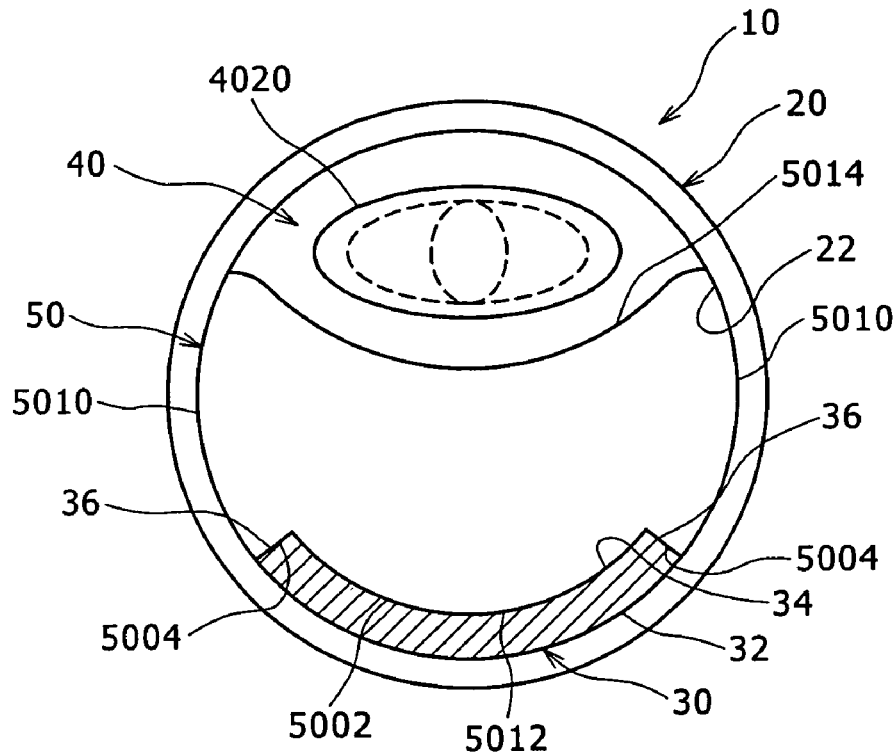
FIG. 4A is a sectional view of a magnetic scale according to a third preferred embodiment of the present invention in the condition where a tube as a component of the retainer member is not yet expanded.
Figure 4B:
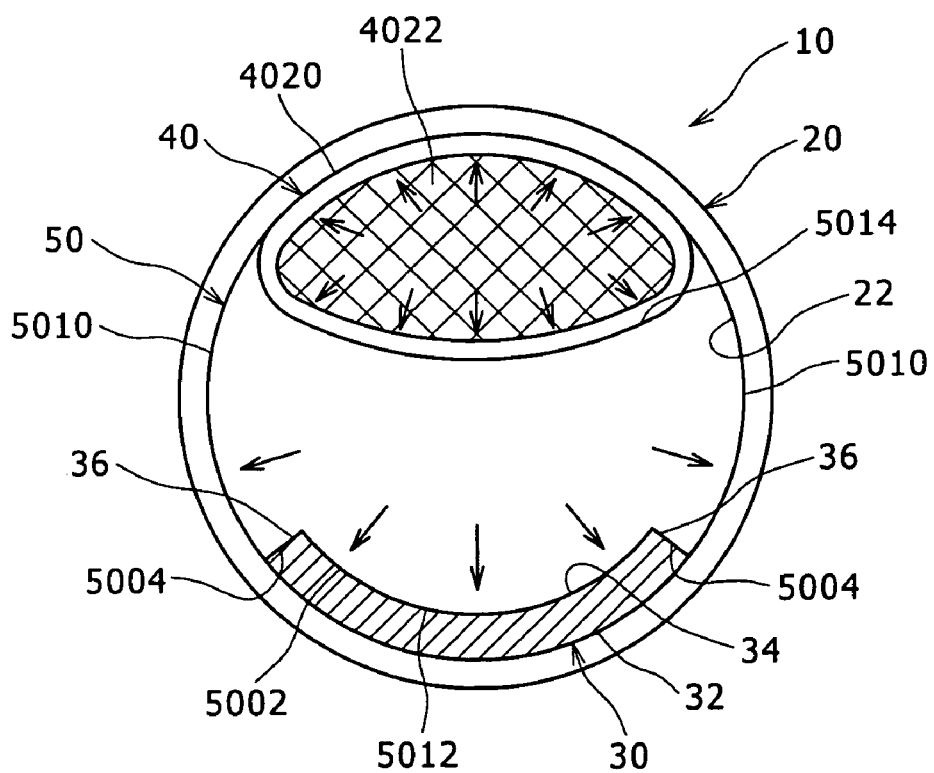
FIG. 4B is a view similar to FIG. 4A, showing an expanded condition of the tube.

FIGS. 4A and 4B are sectional views of a magnetic scale 10 according to the third preferred embodiment.

The third preferred embodiment is different from the first preferred embodiment in configuration of the retainer member 40 and the support member 50.

The support member 50 is a solid cylindrical member having a uniform cross section, and it is inserted in the pipe 20 so as to extend in the longitudinal direction of the pipe 20.

As in the first preferred embodiment, the support member 50 is provided so as to fully cover the back surface 34 of the magnetic member 30.

The support member 50 has a pair of opposite cylindrical portions 5010 each having a radius of curvature slightly smaller than that of the inner surface 22 of the pipe 20, a first recess 5012 formed between the first ends (lower ends) of the opposite cylindrical portions 5010, and a second recess 5014 formed between the second ends (upper ends) of the opposite cylindrical portions 5010.

The first recess 5012 has an arcuate portion 5002 adapted to abut against the back surface 34 of the magnetic member 30 and a pair of end portions 5004 adapted to abut against the end surfaces 36 of the magnetic member 30.

As in the first preferred embodiment, the support member 50 is formed of a material capable of effectively exerting the magnetic force of the magnetic member 30. However, the support member 50 in the third preferred embodiment has a wall thickness larger than that of the support member 50 in the first preferred embodiment, so that the magnetic field strength of the magnetic member 30 can be more increased. For example, a magnetic material such as iron may be used as the material of the support member 50.

As in the first preferred embodiment, the magnetic member 30 may be preliminarily mounted in the first recess 5012 of the support member 50 before inserting the support member 50 into the pipe 20. Alternatively, the support member 50 may be mounted on the magnetic member 30 after inserting the magnetic member 30 into the pipe 20.

The retainer member 40 is composed of an expandable tube 4020 extending in the longitudinal direction of the pipe 20 and a synthetic resin 4022 filled in the tube 4020 in its expanded condition.

The installation of the magnetic member 30 into the pipe 20 is performed in the following manner.

The magnetic member 30 and the support member 50 are inserted into the pipe 20 as shown in FIG. 4A.

The tube 4020 is next inserted into the space defined by the inner surface 22 of the pipe 20 and the second recess 5014 of the support member 50 as shown in FIG. 4A.

Thereafter, the synthetic resin 4022 is charged into the tube 4020 to thereby expand the tube 4020 as shown in FIG. 4B. Accordingly, the support member 50 is pressed toward the first recess 5012 by the expanded tube 4020, so that the back surface 34 of the magnetic member 30 is pressed by the arcuate portion 5002 of the first recess 5012 of the support member 50. As a result, the contact surface 32 of the magnetic member 30 is brought into close contact with the inner surface 22 of the pipe 20 over the length of the magnetic member 30.

In this condition, the charging of the synthetic resin 4022 into the tube 4020 is stopped to cure the synthetic resin 4022, thus completing the installation of the magnetic member 30 into the pipe 20.

According to the third preferred embodiment, effects similar to those of the first preferred embodiment can be exhibited.

Fourth Preferred Embodiment

A fourth preferred embodiment of the present invention will now be described.

Figure 5A:
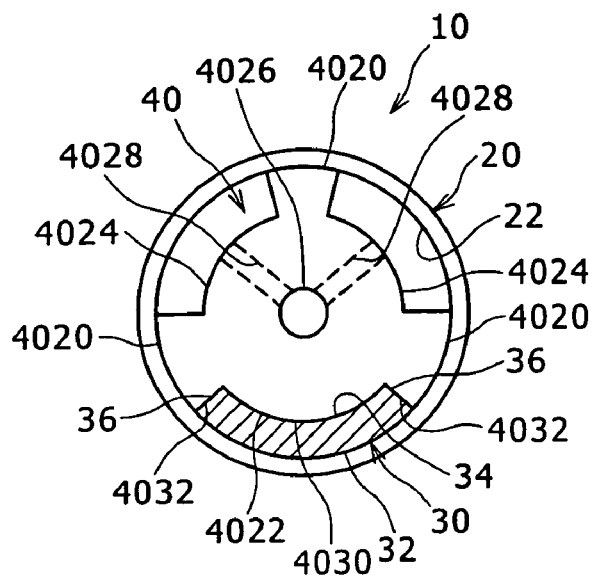
FIG. 5A is a sectional view of a magnetic scale according to a fourth preferred embodiment of the present invention.
Figure 5B:
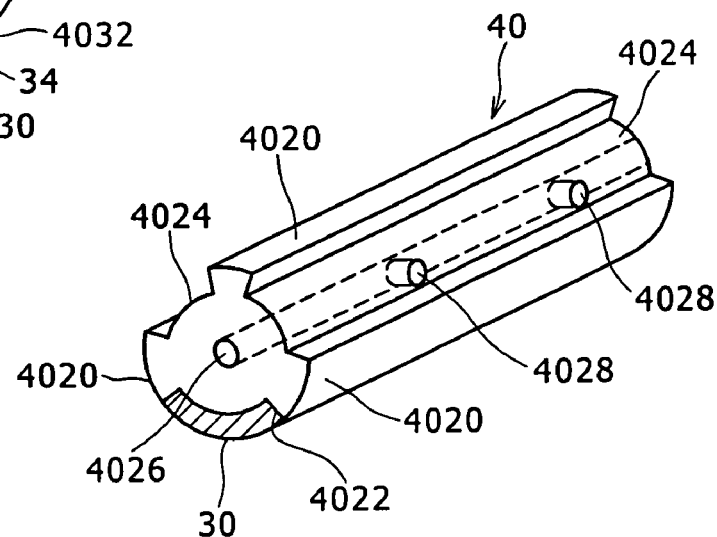
FIG. 5B is a perspective view of the retainer member in the fourth preferred embodiment.

FIG. 5A is a sectional view of a magnetic scale 10 according to the fourth preferred embodiment, and FIG. 5B is a perspective view of a retainer member 40 in the fourth preferred embodiment.

The fourth preferred embodiment is different from the first preferred embodiment in configuration of the retainer member 40, and excludes the support member 50.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 is a solid cylindrical member having a uniform cross section, and it is inserted in the pipe 20 so as to extend in the longitudinal direction of the pipe 20.

The retainer member 40 is provided so as to fully cover the back surface 34 of the magnetic member 30.

The retainer member 40 has three cylindrical portions 4020 spaced apart from each other in the circumferential direction and extending in the longitudinal direction. Each cylindrical portion 4020 has a radius of curvature such that the retainer member 40 is slidably inserted into the pipe 20 and is closely accommodated in the pipe 20 without play. In other words, each cylindrical portion 4020 has a radius of curvature slightly smaller than that of the inner surface 22 of the pipe 20.

One of the three recesses each formed between the adjacent cylindrical portions 4020 is formed as a first recess 4022, and the other two recesses are formed as second recesses 4024.

Further, a center hole 4026 is formed along the axis of the retainer member 40, and a plurality of communication holes 4028 for making the communication between the center hole 4026 and each second recess 4024 are formed so as to extend in the radial direction of the retainer member 40 and are spaced apart from each other in the longitudinal direction of the center hole 4026.

The first recess 4022 has an arcuate portion 4030 adapted to abut against the back surface 34 of the magnetic member 30 and a pair of end portions 4032 adapted to abut against the end surfaces 36 of the magnetic member 30.

In the condition where the retainer member 40 is inserted in the pipe 20, the back surface 34 of the magnetic member 30 is pressed by the arcuate portion 4030 of the first recess 4022 of the retainer member 40, so that the contact surface 32 of the magnetic member 30 is kept in close contact with the inner surface 22 of the pipe 20 over the length of the magnetic member 30.

The magnetic member 30 may be preliminarily mounted in the first recess 4022 of the retainer member 40 before inserting the retainer member 40 into the pipe 20. Alternatively, the retainer member 40 may be mounted on the magnetic member 30 after inserting the magnetic member 30 into the pipe 20.

The installation of the magnetic member 30 into the pipe 20 is performed in the following manner.

The magnetic member 30 and the retainer member 40 are inserted into the pipe 20 as shown in FIG. 5A.

Accordingly, the back surface 34 of the magnetic member 30 is pressed by the arcuate portion 4030 of the first recess 4022 of the retainer member 40, so that the contact surface 32 of the magnetic member 30 is brought into close contact with the inner surface 22 of the pipe 20 over the length of the magnetic member 30.

In this condition, an adhesive is supplied into the center hole 4026 of the retainer member 40. Accordingly, the adhesive supplied into the center hole 4026 is charged through the communication holes 4028 into the spaces defined by the second recesses 4024 and the inner surface 22 of the pipe 20.

The adhesive charged into the above spaces is cured to thereby bond the retainer member 40 to the pipe 20, thus completing the installation of the magnetic member 30 into the pipe 20.

According to the fourth preferred embodiment, effects similar to those of the first preferred embodiment can be exhibited.

Fifth Preferred Embodiment

A fifth preferred embodiment of the present invention will now be described.

Figure 6:
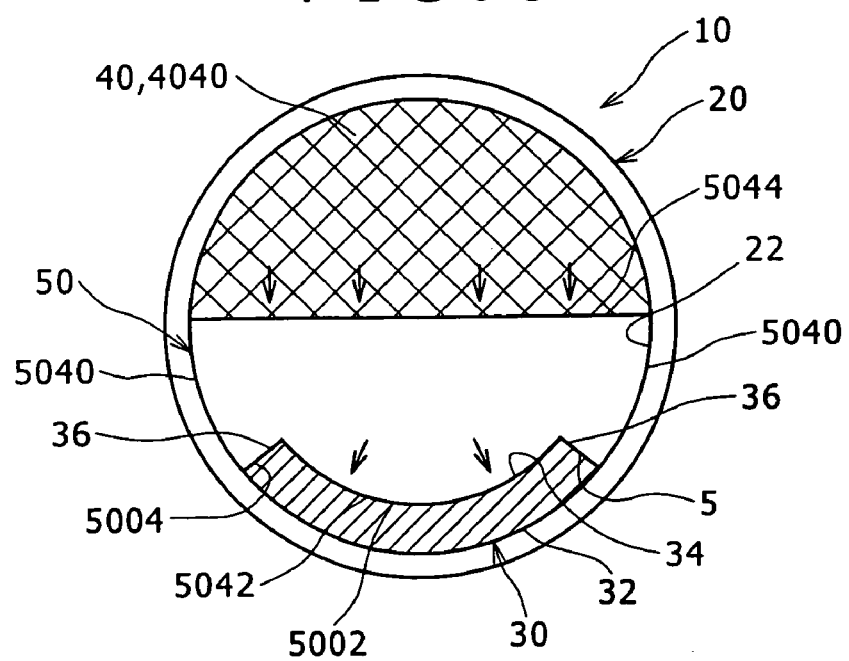
FIG. 6 is a sectional view of a magnetic scale according to a fifth preferred embodiment of the present invention.

FIG. 6 is a sectional view of a magnetic scale 10 according to the fifth preferred embodiment.

The fifth preferred embodiment is different from the first preferred embodiment in configuration of the retainer member 40 and the support member 50.

The support member 50 is a solid cylindrical member having a uniform cross section, and it is inserted in the pipe 20 so as to extend in the longitudinal direction of the pipe 20.

As in the first preferred embodiment, the support member 50 is provided so as to fully cover the back surface 34 of the magnetic member 30.

The support member 50 has a pair of opposite cylindrical portions 5040 each having a radius of curvature slightly smaller than that of the inner surface 22 of the pipe 20, a recess 5042 formed between the first ends (lower ends) of the opposite cylindrical portions 5040, and a flat surface 5044 formed between the second ends (upper ends) of the opposite cylindrical portions 5040.

The recess 5042 has an arcuate portion 5002 adapted to abut against the back surface 34 of the magnetic member 30 and a pair of end portions 5004 adapted to abut against the end surfaces 36 of the magnetic member 30.

As in the third preferred embodiment, the support member 50 has a wall thickness larger than that of the support member 50 in the first preferred embodiment, so that the magnetic field strength of the magnetic member 30 can be more increased. For example, a magnetic material such as iron may be used as the material of the support member 50.

AS in the third preferred embodiment, the magnetic member 30 may be preliminarily mounted in the recess 5042 of the support member 50 before inserting the support member 50 into the pipe 20. Alternatively, the support member 50 may be mounted on the magnetic member 30 after inserting the magnetic member 30 into the pipe 20.

The retainer member 40 is formed of a foaming material 4040 filled in the space defined by the flat surface 5044 of the support member 50 inserted in the pipe 20 and a part of the inner surface 22 of the pipe 20 exposed to the flat surface 5044.

The installation of the magnetic member 30 into the pipe 20 is performed in the following manner.

The magnetic member 30 and the support member 50 are inserted into the pipe 20 as shown in FIG. 6.

The foaming material 4040 is next charged into the space defined by the flat surface 5044 of the support member 50 and the inner surface 22 of the pipe 20, and then foamed to be expanded, thereby applying an increased pressure to the flat surface 5044. Accordingly, the support member 50 is pressed toward the recess 5042 by the expanded foaming material 4040, so that the back surface 34 of the magnetic member 30 is pressed by the arcuate portion 5002 of the recess 5042 of the support member 50. As a result, the contact surface 32 of the magnetic member 30 is brought into close contact with the inner surface 22 of the pipe 20 over the length of the magnetic member 30, thus completing the installation of the magnetic member 30 into the pipe 20.

According to the fifth preferred embodiment, effects similar to those of the first preferred embodiment can be exhibited.

Sixth Preferred Embodiment

A sixth preferred embodiment of the present invention will now be described.

Figure 7A:
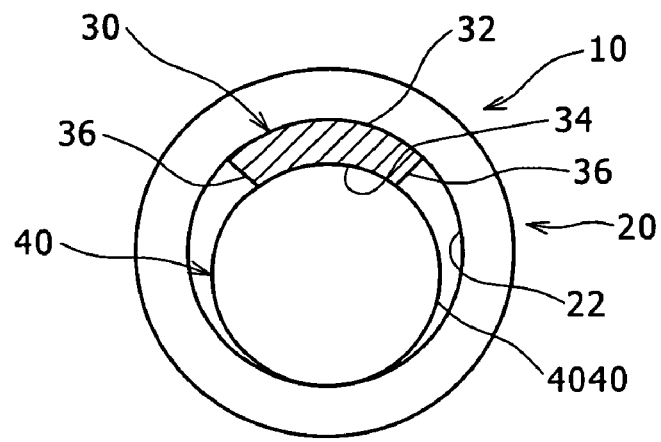
FIG. 7A is a sectional view of a magnetic scale according to a sixth preferred embodiment of the present invention.

FIG. 7A is a sectional view of a magnetic scale 10 according to the sixth preferred embodiment.

The sixth preferred embodiment is different from the first preferred embodiment in configuration of the retainer member 40, and excludes the support member 50.

The retainer member 40 is a lightweight solid bar-shaped member having a uniform circular cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a cylindrical outer surface 4040 for fully covering the back surface 34 of the magnetic member 30 in the condition where the magnetic member 30 and the retainer member 40 are inserted in the pipe 20. The cylindrical outer surface 4040 of the retainer member 40 has a radius of curvature such that it abuts against the back surface 34 of the magnetic member 30 to bring the contact surface 32 of the magnetic member 30 into close contact with the inner surface 22 of the pipe 20 over the length of the magnetic member 30.

The magnetic member 30 may be preliminarily mounted on the outer surface 4040 of the retainer member 40 before inserting the retainer member 40 into the pipe 20. Alternatively, the retainer member 40 may be mounted on the magnetic member 30 after inserting the magnetic member 30 into the pipe 20.

According to the sixth preferred embodiment, effects similar to those of the first preferred embodiment can be exhibited.

Seventh Preferred Embodiment

A seventh preferred embodiment of the present invention will now be described.

Figure 7B:
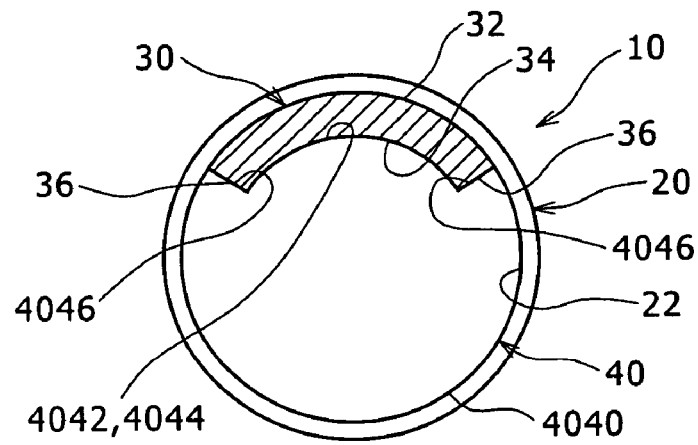
FIG. 7B is a sectional view of a magnetic scale according to a seventh preferred embodiment of the present invention.

FIG. 7B is a sectional view of a magnetic scale 10 according to the seventh preferred embodiment.

The seventh preferred embodiment is a modification of the sixth preferred embodiment, and it is different from the sixth preferred embodiment in shape of the retainer member 40.

The retainer member 40 is a lightweight solid bar-shaped member having a uniform cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a cylindrical outer surface 4040 and a recess 4042. The cylindrical outer surface 4040 and the recess 4042 extend in the longitudinal direction of the retainer member 40.

The cylindrical outer surface 4040 has a radius of curvature slightly smaller than that of the inner surface 22 of the pipe 20.

The recess 4042 has an arcuate portion 4044 adapted to abut against the back surface 34 of the magnetic member 30 and a pair of end portions 4046 adapted to abut against the end surfaces 36 of the magnetic member 30. Thus, the arcuate portion 4044 of the recess 4042 of the retainer member 40 is provided so as to fully cover the back surface 34 of the magnetic member 30.

In the condition where the magnetic member 30 and the retainer member 40 are inserted in the pipe 20, the back surface 34 of the magnetic member 30 is pressed by the arcuate portion 4044 of the recess 4042 of the retainer member 40, so that the contact surface 32 of the magnetic member 30 is kept in close contact with the inner surface 22 of the pipe 20 over the length of the magnetic member 30.

The magnetic member 30 may be preliminarily mounted in the recess 4042 of the retainer member 40 before inserting the retainer member 40 into the pipe 20. Alternatively, the retainer member 40 may be mounted on the magnetic member 30 after inserting the magnetic member 30 into the pipe 20.

According to the seventh preferred embodiment, effects similar to those of the first preferred embodiment can be exhibited.

Eighth Preferred Embodiment

An eighth preferred embodiment of the present invention will now be described.

Figure 7C:
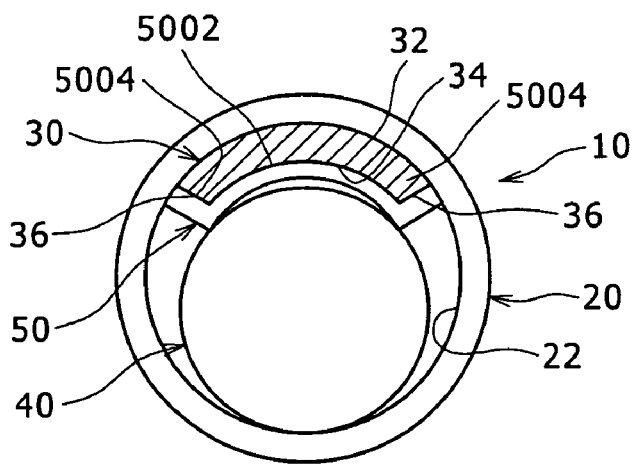
FIG. 7C is a sectional view of a magnetic scale according to an eighth preferred embodiment of the present invention.

FIG. 7C is a sectional view of a magnetic scale 10 according to the eighth preferred embodiment.

The eighth preferred embodiment is a modification of the sixth preferred embodiment, and it is different from the sixth preferred embodiment in the point that the support member 50 is added.

The support member 50 is provided so as to fully cover the back surface 34 of the magnetic member 30.

The support member 50 has an arcuate portion 5002 adapted to abut against the back surface 34 of the magnetic member 30 and a pair of end portions 5004 adapted to abut against the end surfaces 36 of the magnetic member 30.

The support member 50 is formed of a material capable of effectively exerting the magnetic force of the magnetic member 30. More specifically, the support member 50 is formed of a material capable of increasing the magnetic field strength of the magnetic member 30 to thereby increase a surface magnetic flux density on the outer surface of the pipe 20. For example, a magnetic material such as steel may be used as the material of the support member 50.

The support member 50 may be preliminarily mounted on the magnetic member 30 before inserted into the pipe 20. Alternatively, the support member 50 may be mounted on the magnetic member 30 after inserted into the pipe 20.

As in the sixth preferred embodiment, the retainer member 40 is a lightweight solid bar-shaped member having a uniform circular cross section, and it is inserted in the pipe 20 so as to extend in the longitudinal direction of the pipe 20. The retainer member 40 is formed of a lightweight nonmagnetic material such as aluminum alloy.

In the condition where the magnetic member 30, the support member 50, and the retainer member 40 are inserted in the pipe 20, the back surface (concave surface) of the arcuate portion 5002 of the support member 50 is pressed by the outer surface 4040 of the retainer member 40, so that the contact surface 32 of the magnetic member 30 is kept in close contact with the inner surface 22 of the pipe 20 over the length of the magnetic member 30.

According to the eighth preferred embodiment, effects similar to those of the first preferred embodiment can be exhibited.

Ninth Preferred Embodiment

A ninth preferred embodiment of the present invention will now be described.

Figure 8A:
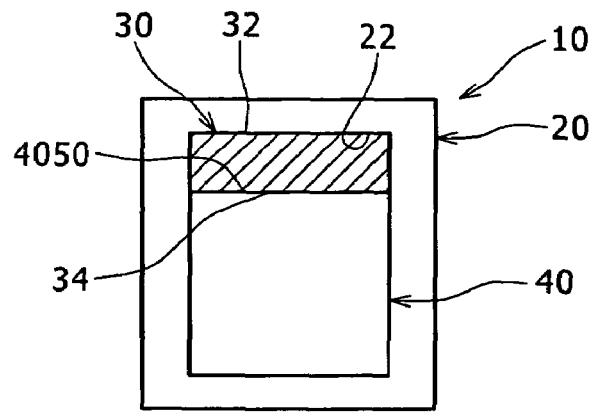
FIG. 8A is a sectional view of a magnetic scale according to a ninth preferred embodiment of the present invention.

FIG. 8A is a sectional view of a magnetic scale 10 according to the ninth preferred embodiment.

The ninth preferred embodiment is different from the sixth preferred embodiment in shape of the pipe 20 and the retainer member 40 and excludes the support member 50.

The pipe 20 is a rectangular cylindrical member.

The retainer member 40 is a lightweight solid bar-shaped member having a uniform rectangular cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a width slightly smaller than the width of the rectangular inside space of the pipe 20 and a height smaller than the height of the rectangular inside space of the pipe 20.

In the condition where the retainer member 40 is inserted in the pipe 20, there is defined a laterally elongated rectangular space between the upper surface 4050 of the retainer member 40 and the upper side of the inner surface 22 of the pipe 20 as a part of the inside space of the pipe 20. This laterally elongated rectangular space is filled with the magnetic member 30.

The magnetic member 30 is a strip member having a laterally elongated rectangular cross section, and it has a thickness slightly smaller than the height of the above laterally elongated rectangular space and a width slightly smaller than the width of the above laterally elongated rectangular space.

In the condition where the magnetic member 30 and the retainer member 40 are inserted in the pipe 20, the back surface 34 of the magnetic member 30 is fully covered with the upper surface 4050 of the retainer member 40, and is pressed by the upper surface 4050, so that the contact surface 32 of the magnetic member 30 is kept in close contact with the inner surface 22 of the pipe 20 over the length of the magnetic member 30.

The magnetic member 30 may be preliminarily mounted on the upper surface 4050 of the retainer member 40 before inserting the retainer member 40 into the pipe 20. Alternatively, the retainer member 40 may be mounted on the magnetic member 30 after inserting the magnetic member 30 into the pipe 20.

According to the ninth preferred embodiment, effects similar to those of the first preferred embodiment can be exhibited.

Tenth Preferred Embodiment

A tenth preferred embodiment of the present invention will now be described.

Figure 8B:
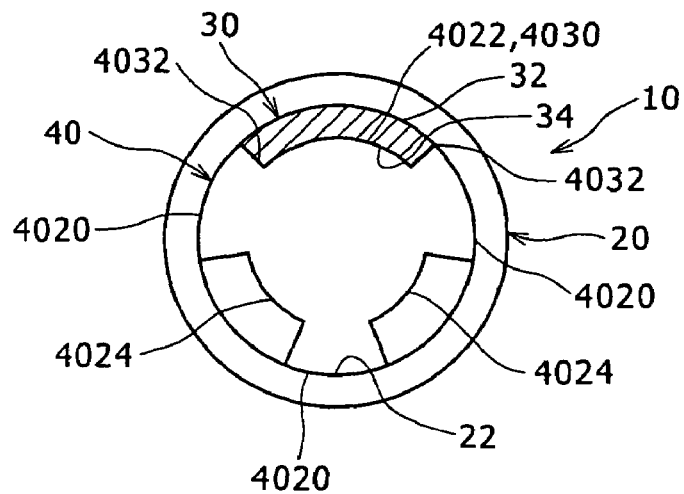
FIG. 8B is a sectional view of a magnetic scale according to a tenth preferred embodiment of the present invention.

FIG. 8B is a sectional view of a magnetic scale 10 according to the tenth preferred embodiment.

The tenth preferred embodiment is a modification of the seventh preferred embodiment, and it is different from the seventh preferred embodiment in shape of the retainer member 40.

The retainer member 40 is a lightweight solid cylindrical (bar-shaped) member having a uniform cross section, and it is inserted in the pipe 20 so as to extend in the longitudinal direction of the pipe 20.

The retainer member 40 is provided so as to fully cover the back surface 34 of the magnetic member 30.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has three cylindrical portions 4020 spaced apart from each other in the circumferential direction and extending in the longitudinal direction.

One of the three recesses each formed between the adjacent cylindrical portions 4020 is formed as a first recess 4022, and the other two recesses are formed as second recesses 4024.

The first recess 4022 has an arcuate portion 4030 adapted to abut against the back surface 34 of -the magnetic member 30 and a pair of end portions 4032 adapted to abut against the end surfaces 36 of the magnetic member 30.

In the condition where the magnetic member 30 and the retainer member 40 are inserted in the pipe 20, the cylindrical portion 4020 opposite to the first recess 4022 abuts against the inner surface 22 of the pipe 20, and the back surface 34 of the magnetic member 30 is pressed by the arcuate portion 4030 of the first recess 4022 of the retainer member 40, so that the contact surface 32 of the magnetic member 30 is kept in close contact with the inner surface 22 of the pipe 20 over the length of the magnetic member 30.

The magnetic member 30 may be preliminarily mounted in the first recess 4022 of the retainer member 40 before inserting the retainer member 40 into the pipe 20. Alternatively, the retainer member 40 may be mounted on the magnetic member 30 after inserting the magnetic member 30 into the pipe.20.

According to the tenth preferred embodiment, effects similar to those of the first preferred embodiment can be exhibited.

Eleventh Preferred Embodiment

An eleventh preferred embodiment of the present invention will now be described.

Figure 8C:
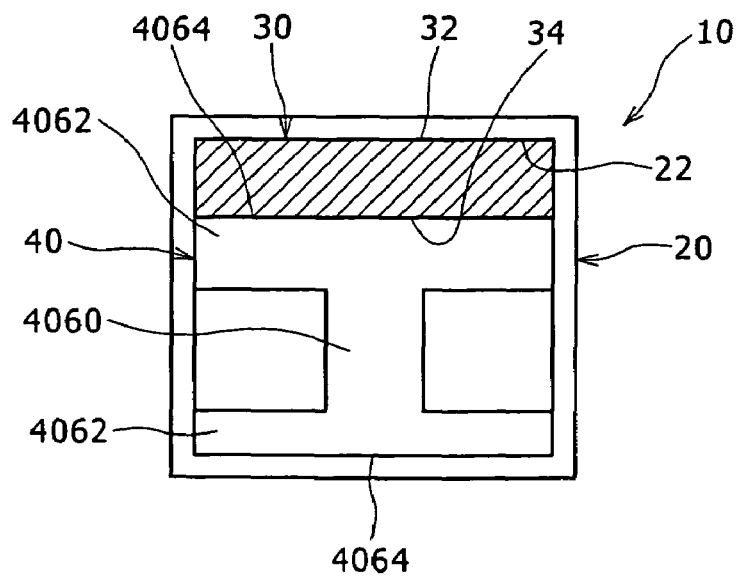
FIG. 8C is a sectional view of a magnetic scale according to an eleventh preferred embodiment of the present invention.

FIG. 8C is a sectional view of a magnetic scale 10 according to the eleventh preferred embodiment.

The eleventh preferred embodiment is a modification of the ninth preferred embodiment, and it is different from the ninth preferred embodiment only in shape of the retainer member 40.

The retainer member 40 is a lightweight bar-shaped member having a uniform cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has an H-shaped cross section such that it is composed of a web 4060 and a pair of flanges 4062 formed at the opposite ends of the web 4060.

Each flange 4062 has a width slightly smaller than the width of the rectangular inside space of the pipe 20, and the distance between the outer surfaces 4064 of the two flanges 4062 is smaller than the height of the rectangular inside space of the pipe 20.

In the condition where the retainer member 40 is inserted in the pipe 20, the outer surface 4064 of the lower flange 4062 of the retainer member 40 is placed on the lower side of the inner surface 22 of the pipe 20, and there is defined a laterally elongated rectangular space between the outer surface 4064 of the upper flange 4062 of the retainer member 40 and the upper side of the inner surface 22 of the pipe 20 as a part of the inside space of the pipe 20. This laterally elongated rectangular space is filled with the magnetic member 30.

The magnetic member 30 is a strip member having a laterally elongated rectangular cross section, and it has a thickness slightly smaller than the height of the above laterally elongated rectangular space and a width slightly smaller than the width of the above laterally elongated rectangular space.

In the condition where the magnetic member 30 and the retainer member 40 are inserted in the pipe 20, the back surface 34 of the magnetic member 30 is fully covered with the outer surface 4064 of the upper flange 4062 of the retainer member 40, and is pressed by the outer surface 4064 of the upper flange 4062, so that the contact surface 32 of the magnetic member 30 is kept in close contact with the inner surface 22 of the pipe 20 over the length of the magnetic member 30.

The magnetic member 30 may be preliminarily mounted on the outer surface 4064 of the upper flange 4062 of the retainer member 40 before inserting the retainer member 40 into the pipe 20. Alternatively, the retainer member 40 may be mounted on the magnetic member 30 after inserting the magnetic member 30 into the pipe 20.

According to the eleventh preferred embodiment, effects similar to those of the first preferred embodiment can be exhibited.

Twelfth Preferred Embodiment

A twelfth preferred embodiment of the present invention will now be described.

Figure 9A:
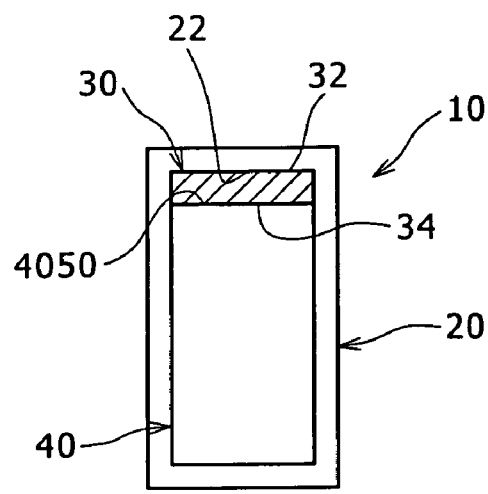
FIG. 9A is a sectional view of a magnetic scale according to a twelfth preferred embodiment of the present invention.

FIG. 9A is a sectional view of a magnetic scale 10 according to the twelfth preferred embodiment.

The twelfth preferred embodiment is a modification of the ninth preferred embodiment, and it is different from the ninth preferred embodiment in shape of the pipe 20 and the retainer member 40.

The pipe 20 is a cylindrical member having a vertically elongated rectangular cross section.

The retainer member 40 is a lightweight solid bar-shaped member having a uniform vertically elongated rectangular cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a width slightly smaller than the width of the rectangular inside space of the pipe 20 and a height smaller than the height of the rectangular inside space of the pipe 20.

In the condition where the retainer member 40 is inserted in the pipe 20, there is defined a laterally elongated rectangular space between the upper surface 4050 of the retainer member 40 and the upper side of the inner surface 22 of the pipe 20 as a part of the inside space of the pipe 20. This laterally elongated rectangular space is filled with the magnetic member 30.

The magnetic member 30 is a strip member having a laterally elongated rectangular cross section, and it has a thickness slightly smaller than the height of the above laterally elongated rectangular space and a width slightly smaller than the width of the above laterally elongated rectangular space.

In the condition where the magnetic member 30 and the retainer member 40 are inserted in the pipe 20, the back surface 34 of the magnetic member 30 is fully covered with the upper surface 4050 of the retainer member 40 forming a shorter side of its rectangular cross section, and is pressed by the upper surface 4050, so that the contact surface 32 of the magnetic member 30 is kept in close contact with the inner surface 22 of the pipe 20 over the length of the magnetic member 30.

The magnetic member 30 may be preliminarily mounted on the upper surface 4050 of the retainer member 40 before inserting the retainer member 40 into the pipe 20. Alternatively, the retainer member 40 may be mounted on the magnetic member 30 after inserting the magnetic member 30 into the pipe 20.

According to the twelfth preferred embodiment, effects similar to those of the first preferred embodiment can be exhibited.

Since the pipe 20 has a vertically elongated rectangular cross section, the magnetic scale 10 has a higher rigidity along the longer sides of the pipe 20 as viewed in cross section. Accordingly, it is advantageous to utilize this higher rigidity depending upon the use of the magnetic scale 10.

Thirteenth Preferred Embodiment

A thirteenth preferred embodiment of the present invention will now be described.

Figure 9B:
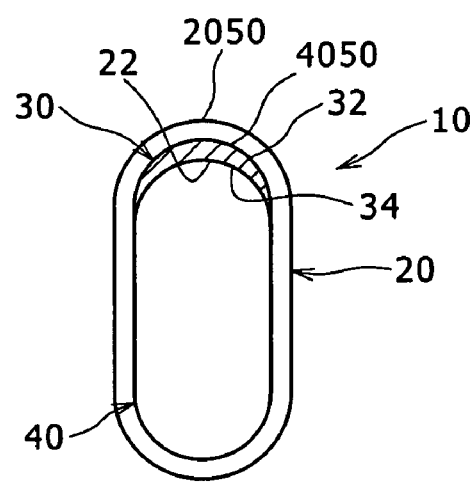
FIG. 9B is a sectional view of a magnetic scale according to a thirteenth preferred embodiment of the present invention.

FIG. 9B is a sectional view of a magnetic scale 10 according to the thirteenth preferred embodiment.

The thirteenth preferred embodiment is a modification of the twelfth preferred embodiment, and it is different from the twelfth preferred embodiment in shape of the pipe 20 and the retainer member 40.

The pipe 20 is a cylindrical member having a vertically elongated oval cross section.

The retainer member 40 is a lightweight solid bar-shaped member having a uniform vertically elongated oval cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a width slightly smaller than the width of the oval inside space of the pipe 20 and a height smaller than the height of the oval inside space of the pipe 20.

In the condition where the retainer member 40 is inserted in the pipe 20, there is defined a laterally elongated crescent space between the arcuate upper surface 4050 of the retainer member 40 and the inner surface 22 of the pipe 20 at its upper arcuate portion 2050 as a part of the inside space of the pipe 20. This laterally elongated crescent space is filled with the magnetic member 30.

The magnetic member 30 is a strip member having a laterally elongated crescent cross section, and it has a maximum thickness slightly smaller than the maximum height of the above laterally elongated crescent space and a width slightly smaller than the width of the above laterally elongated crescent space. More specifically, the magnetic member 30 has a crescent cross section thickest at a laterally central portion and gradually reduced in thickness toward the laterally opposite ends.

In the condition where the magnetic member 30 and the retainer member 40 are inserted in the pipe 20, the back surface 34 of the magnetic member 30 is fully covered with the arcuate upper surface 4050 of the retainer member 40, and is pressed by the arcuate upper surface 4050, so that the contact surface 32 of the magnetic member 30 is kept in close contact with the inner surface 22 of the pipe 20 over the length of the magnetic member 30.

The magnetic member 30 may be preliminarily mounted on the arcuate upper surface 4050 of the retainer member 40 before inserting the retainer member 40 into the pipe 20. Alternatively, the retainer member 40 may be mounted on the magnetic member 30 after inserting the magnetic member 30 into the pipe 20.

According to the thirteenth preferred embodiment, effects similar to those of the first preferred embodiment can be exhibited.

Since the pipe 20 has a vertically elongated oval cross section, the magnetic scale 10 has a higher rigidity in the vertical direction of the pipe 20 as viewed in cross section. Accordingly, it is advantageous to utilize this higher rigidity depending upon the use of the magnetic scale 10.

Fourteenth Preferred Embodiment

A fourteenth preferred embodiment of the present invention will now be described.

Figure 9C:
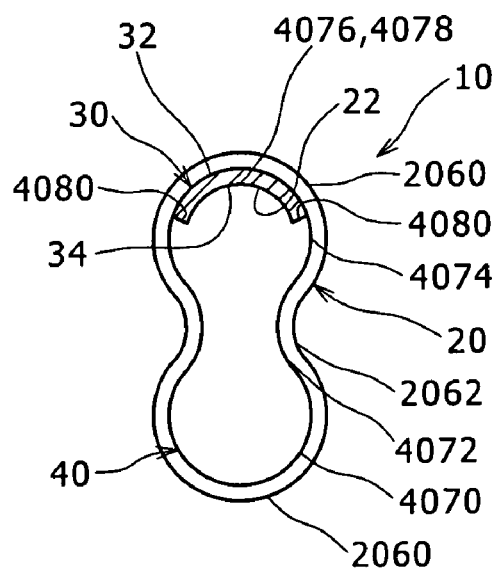
FIG. 9C is a sectional view of a magnetic scale according to a fourteenth preferred embodiment of the present invention.

FIG. 9C is a sectional view of a magnetic scale 10 according to the fourteenth preferred embodiment.

The fourteenth preferred embodiment is a modification of the thirteenth preferred embodiment, and it is different from the thirteenth preferred embodiment in shape of the pipe 20 and the retainer member 40.

The pipe 20 is a cylindrical member having a vertically elongated gourd-shaped cross section in such a manner that it has a pair of upper and lower cylindrical portions 2060 and a narrow portion 2062 formed by a pair of opposed concave surfaces connecting the upper and lower cylindrical portions 2060.

The retainer member 40 is a lightweight solid bar-shaped member having a uniform vertically elongated gourd-shaped cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a lower cylindrical portion 4070 inserted in the lower cylindrical portion 2060 of the pipe 20, a narrow portion 4072 formed by a pair of opposed concave surfaces connected to the lower cylindrical portion 4070, and an upper cylindrical portion 4074 connected to the narrow portion 4072 and inserted in the upper cylindrical portion 2060 of the pipe 20. The upper cylindrical portion 4074 of the retainer member 40 is formed with an arcuate recess 4076.

The arcuate recess 4076 has an arcuate portion 4078 adapted to abut against the back surface 34 of the magnetic member 30 and a pair of end portions 4080 adapted to abut against the end surfaces 36 of the magnetic member 30.

In the condition where the magnetic member 30 and the retainer member 40 are inserted in the pipe 20, the lower cylindrical portion 4070 of the retainer member 40 abuts against the inner surface 22 of the pipe 20 at its lower cylindrical portion 2060, and the back surface 34 of the magnetic member 30 is pressed by the arcuate portion 4078 of the recess 4076 of the retainer member 40, so that the contact surface 32 of the magnetic member 30 is kept in close contact with the inner surface 22 of the pipe 20 over the length of the magnetic member 30.

The magnetic member 30 may be preliminarily mounted in the recess 4076 of the retainer member 40 before inserting the retainer member 40 into the pipe 20. Alternatively, the retainer member 40 may be mounted on the magnetic member 30 after inserting the magnetic member 30 into the pipe 20.

According to the fourteenth preferred embodiment, effects similar to those of the first preferred embodiment can be exhibited.

Since the pipe 20 has a vertically elongated gourd-shaped cross section, the magnetic scale 10 has a higher rigidity in the vertical direction of the pipe 20 as viewed in cross section. Accordingly, it is advantageous to utilize this higher rigidity depending upon the use of the magnetic scale 10.

Furthermore, since the narrow portion 2062 as a concave portion is formed at a vertically intermediate portion of the pipe 20, it is advantageous to utilize this concave portion depending upon the use of the magnetic scale 10 (e.g., the interference with another component such as a slider can be avoided).

Fifteenth Preferred Embodiment

A fifteenth preferred embodiment of the present invention will now be described.

Figure 9D:
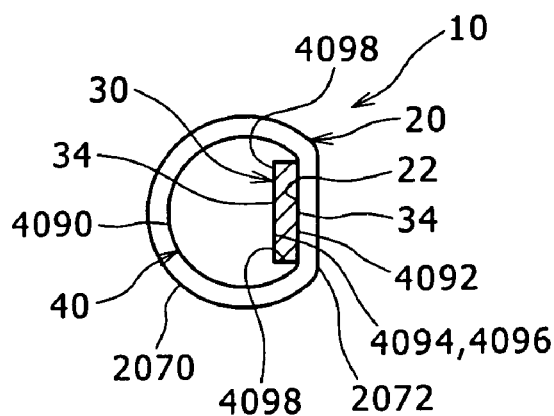
FIG. 9D is a sectional view of a magnetic scale according to a fifteenth preferred embodiment of the present invention.

FIG. 9D is a sectional view of a magnetic scale 10 according to the fifteenth preferred embodiment.

The fifteenth preferred embodiment is a modification of the twelfth preferred embodiment, and it is different from the twelfth preferred embodiment in shape of the pipe 20 and the retainer member 40.

The pipe 20 is composed of a partially cutaway, circular cylindrical portion 2070 and a flat portion 2072 so formed as to close such a cutaway part of the circular cylindrical portion 2070.

The retainer member 40 is a lightweight solid bar-shaped member having a uniform cross section, and it is inserted in the pipe 20 so as to extend in the longitudinal direction of the pipe 20.

The retainer member 40 is formed of a material having no magnetic effect on the magnetic force of the magnetic member 30. More specifically, the retainer member 40 is formed of a lightweight nonmagnetic material such as aluminum alloy.

The retainer member 40 has a partially cutaway, circular cylindrical portion 4090 inserted in the circular cylindrical portion 2070 and a flat portion 4092 formed at such a cutaway part of the circular cylindrical portion 2070.

The flat portion 4092 of the retainer member 40 is formed with a recess 4094. The recess 4094 has a flat portion 4096 adapted to abut against the back surface 34 of the magnetic member 30 and a pair of end portions 4098 adapted to abut against the end surfaces 36 of the magnetic member 30.

In the condition where the magnetic member 30 and the retainer member 40 are inserted in the pipe 20, the circular cylindrical portion 4090 of the retainer member 40 abuts against the inner surface 22 of the pipe 20, and the back surface 34 of the magnetic member 30 is pressed by the flat portion 4096 of the recess 4094 of the retainer member 40, so that the contact surface 32 of the magnetic member 30 is kept in close contact with the inner surface 22 of the pipe 20 over the length of the magnetic member 30.

The magnetic member 30 may be preliminarily mounted in the recess 4094 of the retainer member 40 before inserting the retainer member 40 into the pipe 20. Alternatively, the retainer member 40 may be mounted on the magnetic member 30 after inserting the magnetic member 30 into the pipe 20.

According to the fifteenth preferred embodiment, effects similar to those of the first preferred embodiment can be exhibited.

Sixteenth Preferred Embodiment

A sixteenth preferred embodiment of the present invention will now be described.

Figure 10A:
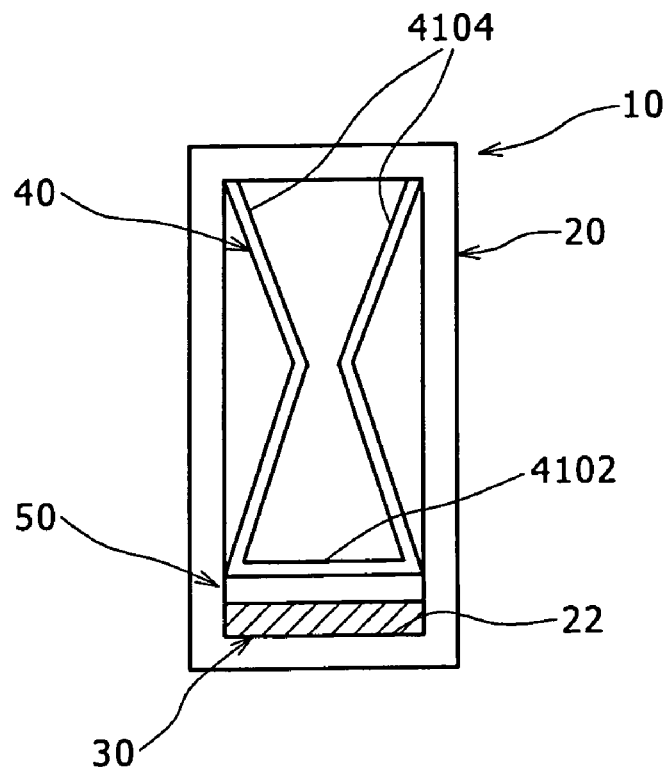
FIG. 10A is a sectional view of a magnetic scale according to a sixteenth preferred embodiment of the present invention.

FIG. 10A is a sectional view of a magnetic scale 10 according to the sixteenth preferred embodiment.

The sixteenth preferred embodiment is a modification of the first preferred embodiment, and it is different from the first preferred embodiment in shape of the pipe 20, the retainer member 40, and the support member 50.

The pipe 20 is a rectangular cylindrical member.

The magnetic member 30 is a strip member having a rectangular cross section, and it is placed on the lower part of the inner surface 22 of the pipe 20.

The support member 50 is also a strip member having a rectangular cross section, and it is placed on the back surface 34 of the magnetic member 30 so as to fully cover the back surface 34.

The support member 50 may be preliminarily mounted on the magnetic member 30 before inserted into the pipe 20.

Alternatively, the support member 50 may be mounted on the magnetic member 30 after inserted into the pipe 20.

The retainer member 40 is provided by a spring plate having a bottom plate portion 4102 adapted to abut against the back surface of the support member 50 and a pair of arm portions 4104 extending upward from the laterally opposite ends of the bottom plate portion 4102 so as to bend inwardly at middle portions and to abut against the upper part of the inner surface 22 of the pipe 20.

In the condition where the retainer member 40 is inserted in the pipe 20, the support member 50 is pressed against the back surface 34 of the magnetic member 30 by the elastic force of the retainer member 40, so that the contact surface 32 of the magnetic member 30 is kept in close contact with the inner surface 22 of the pipe 20.

According to the sixteenth preferred embodiment, effects similar to those of the first preferred embodiment can be exhibited.

Seventeenth Preferred Embodiment

A seventeenth preferred embodiment of the present invention will now be described.

Figure 10B:
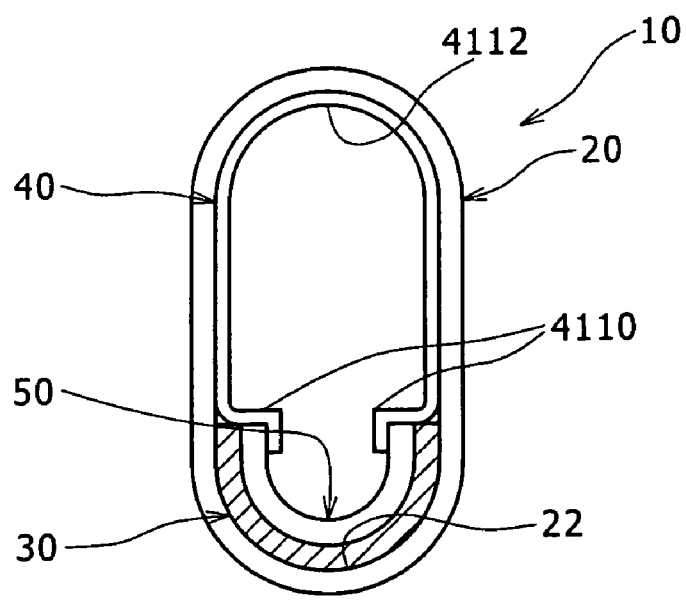
FIG. 10B is a sectional view of a magnetic scale according to a seventeenth preferred embodiment of the present invention.

FIG. 10B is a sectional view of a magnetic scale 10 according to the seventeenth preferred embodiment.

The seventeenth is a modification of the sixteenth preferred embodiment, and it is different from the sixteenth preferred embodiment in shape of the pipe 20, the retainer member 40, and the support member 50.

The pipe 20 is an oval cylindrical member.

The magnetic member 30 is a strip member having an arcuate cross section, and it is placed on the lower arcuate part of the inner surface 22 of the pipe 20.

The support member 50 is also a stip member having an arcuate cross section, and it is placed on the back surface 34 of the magnetic member 30 so as to fully cover the back surface 34.

The support member 50 may be preliminarily mounted on the magnetic member 30 before inserted into the pipe 20. Alternatively, the support member 50 may be mounted on the magnetic member 30 after inserted into the pipe 20.

The retainer member 40 is provided by a spring plate having a pair of engaging portions 4110 adapted to abut against the opposite end portions of the back surface of the support member 50 and an oval portion 4112 connecting the pair of engaging portions 4110.

In the condition where the retainer member 40 is inserted in the pipe 20, the support member 50 is pressed against the back surface 34 of the magnetic member 30 by the elastic force of the retainer member 40, so that the contact surface 32 of the magnetic member 30 is kept in close contact with the inner surface 22 of the pipe 20.

According to the seventeenth preferred embodiment, effects similar to those of the first preferred embodiment can be exhibited.

Eighteenth Preferred Embodiment

An eighteenth preferred embodiment of the present invention will now be described.

Figure 11A:
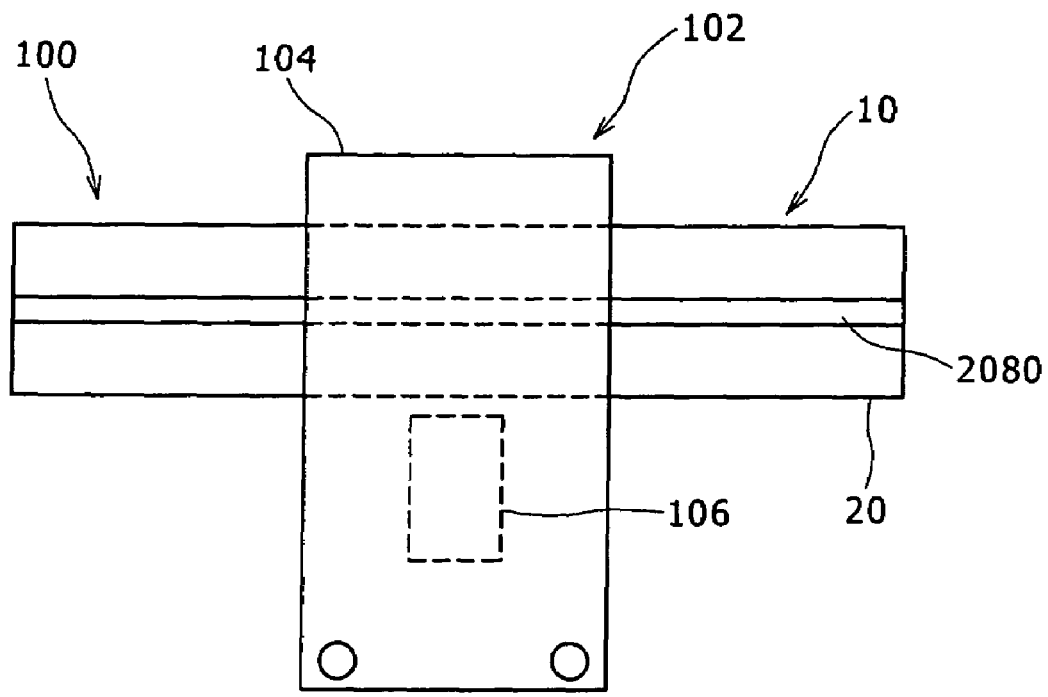
FIG. 11A is a schematic view of a position detecting device using a magnetic scale according to an eighteenth preferred embodiment of the present invention.
Figure 11B:
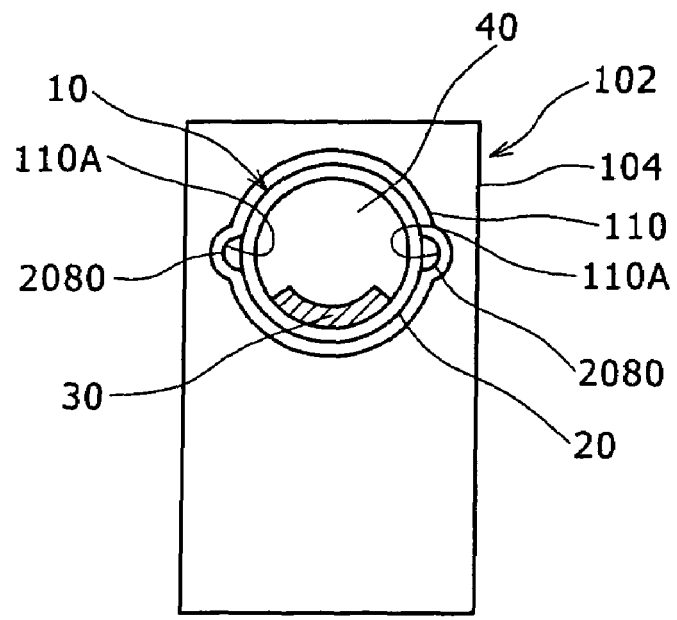
FIG. 11B is a sectional view of the position detecting device shown in FIG. 11A.

FIG. 11A is a schematic view of a position detecting device 100 using a magnetic scale 10 according to the eighteenth preferred embodiment, and FIG. 11B is a sectional view of the position detecting device 100 having a detecting head 102 shown in FIG. 11A.

The detecting head 102 includes a slide base 104 and a magnetic sensor 106.

The slide base 104 has a metal bearing 110 through which the pipe 20 is inserted, so that the slide base 104 is slidably supported through the metal bearing 110 to the pipe 20 in such a manner as to be slidable in the longitudinal direction of the pipe 20.

The magnetic sensor 106 is built in the slide base 104, and it is so positioned as to be opposed to the magnetic member 30 of the magnetic scale 10 with a given spacing defined therebetween.

The magnetic sensor 106 is similar in configuration to that in the first preferred embodiment. Accordingly, when the detecting head 102 is moved in the longitudinal direction of the pipe 20 to detect the magnetic marks formed in the magnetic member 30, a periodically changing (e.g., sinusoidally changing) detection signal can be obtained from the magnetic sensor 106. Such a detection signal is supplied from the magnetic sensor 106 to a detecting circuit known in the art, thereby detecting a displacement of the detecting head 102 relative to the magnetic scale 10.

The magnetic scale 10 is similar to that according to the seventh preferred embodiment shown in FIG. 7B, and it is composed of a pipe 20, a magnetic member 30, and a retainer member 40.

However, the eighteenth preferred embodiment is different from the seventh preferred embodiment in the point that a plurality of (e.g., two in this preferred embodiment) radially outward projections 2080 are formed on the outer surface of the pipe 20 so as to extend straight in the longitudinal direction of the pipe 20 and to be spaced apart from each other in the circumferential direction of the pipe 20.

The plural projections 2080 are so positioned as to be spaced apart from the magnetic member 30 in the circumferential direction of the pipe 20.

The metal bearing 110 of the slide base 104 is formed with a plurality of recesses 110A respectively slidably engaging with the plural projections 2080 of the pipe 20.

According to the eighteenth preferred embodiment, effects similar to those of the first preferred embodiment can be exhibited. Additionally, with a simple configuration such that the projections 2080 are formed on the pipe 20, rotation of the detecting head 102 about the axis of the pipe 20 can be prevented to thereby stabilize the voltage level of the detection signal output from the magnetic sensor 106 of the detecting head 102.

Nineteenth Preferred Embodiment

A nineteenth preferred embodiment of the present invention will now be described.

Figure 12A:
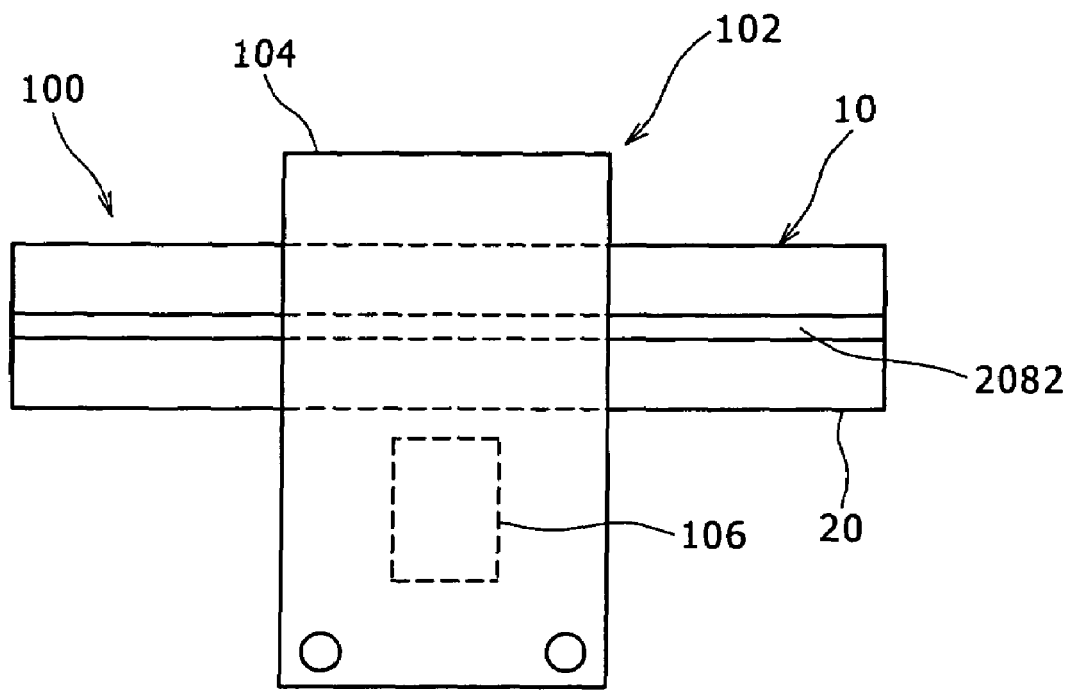
FIG. 12A is a schematic view of a position detecting device using a magnetic scale according to a nineteenth preferred embodiment of the present invention.
Figure 12B:
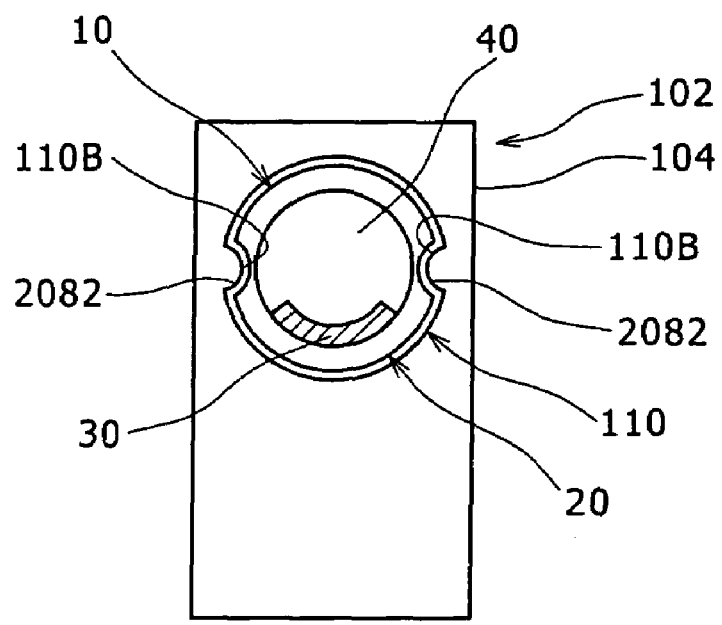
FIG. 12B is a sectional view of the position detecting device shown in FIG. 12A.

FIG. 12A is a schematic view of a position detecting device 100 using a magnetic scale 10 according to the nineteenth preferred embodiment, and FIG. 12B is a sectional view of the position detecting device 100 shown in FIG. 12A.

The nineteenth preferred embodiment is a modification of the eighteenth preferred embodiment, and it is different from the eighteenth preferred embodiment in the point that a plurality of recesses 2082 rather than the plural projections 2080 are formed on the outer surface of the pipe 20.

More specifically, the plural radially inward recesses 2082 (e.g., two in this preferred embodiment) are formed on the outer surface of the pipe 20 so as to extend straight in the longitudinal direction of the pipe 20 and to be spaced apart from each other in the circumferential direction of the pipe 20.

The metal bearing 110 of the slide base 104 is formed with a plurality of projections 110B respectively slidably engaging with the plural recesses 2082 of the pipe 20.

According to the nineteenth preferred embodiment, effects similar to those of the eighteenth preferred embodiment can be exhibited.

While the magnetic member 30 is formed of an elastic material such as rubber magnet in each preferred embodiment, the material of the magnetic member 30 is not limited to such a material, but any other polarizable materials such as plastic magnet, magnetic material coated member, rare-earth magnetic material, and ferrite magnetic material may be used for the magnetic member 30.

Further, while the cross section of the pipe 20 is circular, rectangular, or oval in each preferred embodiment, the cross section of the pipe 20 may be of any other shapes including a polygonal shape.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

The invention claimed is:

1. A magnetic scale comprising:
   a pipe;
   a strip-shaped magnetic member having a one side surface in a direction across a thickness as a contact surface closely attached to an inner surface of said pipe and the other side surface opposite to said one side surface as a back surface, said magnetic member being inserted in said pipe so as to extend straight in a longitudinal direction of said pipe, said magnetic member being formed with magnetic marks provided by a plurality of N poles and S poles alternately arranged in the longitudinal direction of said magnetic member; and
   a retainer member inserted in said pipe to press said back surface of said magnetic member toward said contact surface of said magnetic member, thereby maintaining a closely contact condition of said contact surface to the inner surface of said pipe.

2. The magnetic scale according to claim 1, further comprising a support member for fully covering said back surface of said magnetic member so that said back surface of said magnetic member is pressed toward said contact surface of said magnetic member by said retainer member through said support member.

3. The magnetic scale according to claim 2, wherein said support member is formed of a material capable of effectively exerting the magnetic force of said magnetic member.

4. The magnetic scale according to claim 2, wherein said support member is formed of a magnetic material.

5. The magnetic scale according to claim 1, wherein said retainer member comprises a bar-shaped member having a uniform cross section.

6. The magnetic scale according to claim 1, wherein said retainer member comprises a plurality of narrow spring plates arranged at given intervals in the longitudinal direction of said magnetic member for exerting an elastic force in the direction of pressing said back surface toward said contact surface.

7. The magnetic scale according to claim 1, wherein said retainer member comprises an expandable tube inserted in said pipe so as to extend in the longitudinal direction of said pipe and a synthetic resin filled in said expandable tube in its expanded condition.

8. The magnetic scale according to claim 1, wherein said retainer member comprises a foaming material filled in said pipe in a foamed condition of said foaming material.

9. The magnetic scale according to claim 1, wherein said retainer member is formed of a material having no magnetic effect on the magnetic force of said magnetic member.

10. The magnetic scale according to claim 1, wherein said retainer member is formed of a lightweight nonmagnetic material.

11. The magnetic scale according to claim 10, wherein said lightweight nonmagnetic material comprises aluminum alloy.

12. The magnetic scale according to claim 1, wherein said retainer member is fixed in said pipe by an adhesive.

13. The magnetic scale according to claim 1, wherein said pipe is formed of a material having no magnetic effect on the magnetic force of said magnetic member.

14. The magnetic scale according to claim 1, wherein said pipe is formed of a nonmagnetic material.

15. The magnetic scale according to claim 1, wherein said magnetic member is formed of an elastic material.

16. The magnetic scale according to claim 1, wherein said pipe has a circular cross section.

17. The magnetic scale according to claim 1, wherein said pipe has a rectangular cross section.

18. The magnetic scale according to claim 1, wherein a radially outward projection is formed on the outer surface of said pipe so as to extend in the longitudinal direction of said pipe.

19. The magnetic scale according to claim 1, wherein a radially inward recess is formed on the outer surface of said pipe so as to extend in the longitudinal direction of said pipe.

* * * * *